United States Patent [19]
Brenner et al.

[11] 3,723,738
[45] Mar. 27, 1973

[54] INTRUSION DETECTION FALSE ALARM REDUCTION SYSTEM

[75] Inventors: Charles H. Brenner; Ronald W. Kassik, Scottsdale, both of Ariz.

[73] Assignee: Motorola, Inc., Franklin Park, Ill.

[22] Filed: May 20, 1971

[21] Appl. No.: 145,168

[52] U.S. Cl..............250/83.3 H, 250/220, 250/221, 343/5 PD, 343/12 SB
[51] Int. Cl..............................................H01j 39/00
[58] Field of Search..........250/83.3 R, 83.3 H, 220, 250/219 LG, 219 WD, 221, 222; 340/189; 343/5, 6, 7 A, 7 ED, 7.3, 7.9, 17.1, 12 SB

[56] References Cited

UNITED STATES PATENTS

| | | | |
|---|---|---|---|
| 3,300,768 | 1/1967 | Bystrom | 343/5 PD |
| 3,099,833 | 7/1963 | Tucker | 343/12 SB |
| 3,524,180 | 8/1970 | Cruse | 250/83.3 H |
| 3,422,428 | 1/1969 | Jensen | 343/7 A |
| 3,170,157 | 2/1965 | Schreitmueller | 343/12 SB |
| 3,274,593 | 9/1966 | Varela | 343/12 SB |
| 3,161,870 | 12/1964 | Dincoffs | 343/12 SB |
| 3,070,795 | 12/1962 | Chambers | 343/12 SB |
| 3,597,755 | 8/1971 | Parkin | 250/83.3 H |
| 3,036,219 | 5/1962 | Thompson | 250/220 M |
| 3,210,546 | 10/1965 | Perron | 250/83.3 H |

Primary Examiner—James W. Lawrence
Assistant Examiner—D. C. Nelms
Attorney—Mueller & Aichele

[57] ABSTRACT

False alarm reduction means for an intrusion detection system are disclosed wherein two optical transmitting systems with highly directive beams alternately illuminate adjacent but non-overlapping cross-sections. A signal processor indicates true target detection only when the target return from two or more successive pulses exceed a predetermined threshold which implies that the target is sufficiently large that it intersects both beams.

6 Claims, 6 Drawing Figures

PATENTED MAR 27 1973  3,723,738

INVENTOR.
Charles H. Brenner
Ronald Kassik

BY

*Mueller & Aichele*

ATTY'S

INTRUSION DETECTION FALSE ALARM REDUCTION SYSTEM

BACKGROUND

This invention relates to an intrusion detection system and apparatus therefore utilizing radiation means from which reflections are adapted to be received, more particularly to such a system and apparatus for reducing false alarms produced by small unobjectionable objects entering the radiation field, and it is an object of the invention to provide an improved system and apparatus of this nature.

In intrusion detection systems and apparatus, such as may be used in jungle, or other, environments where there are small animals, insects and the like which may enter into and move out of the radiation beam of a detector, it is a serious problem to distinguish between these small false targets or objects as they pass into and out of the radiation beam and the desired target such as personnel and vehicles. Detections of undesired objects are, of course, essentially false alarms. That is to say, in an intrusion detecting system of the nature involved, an operator would not be interested in knowing that a small animal, a bird or a swarm of insects had passed into the beam area and had been detected as a violation of the area. On the other hand, the operator of such a system is, of course, quite interested when the intrusion occurs by a man or a vehicle, for example, passing through the protected area.

Infrared detection systems are well known and stacked beam systems which are pulsed at the same time are also well known but such systems do not achieve the objects of the present invention which is to reduce the false alarm rate. Sonar systems wherein spaced pulses from separate transducers are sent out at different times are known but in these systems the reflected, received pulses are merely superimposed to obtain an improved signal to noise ratio and do not distinguish between objects or relate in any way, to the reduction of false alarms. Accordingly, it is an object of the invention to provide an improved system and apparatus of the nature indicated which will overcome the defects of the prior art.

It is a further object of the invention to provide an improved radiation system of the nature indicated for reducing false alarms wherein the radiation from two transmitting sources that are pulsed alternately are confined to beams that are essentially parallel to each other, the detection of successive pulse returns is utilized to indicate that an object of substantial size has passed through the beams inasmuch as two pulses one from each beam, is interrupted and reflected back to the receiver. Such a received combination of signals requires an object having a size, for example, approaching that of a man when the radiation beams are spaced apart, for example, by about 8 inches.

It is a further object of the invention to provide an improved system, apparatus and method of the nature indicated which is simple in concept, inexpensive to construct and efficient in operation.

It is a further object of the invention to provide an improved apparatus of the nature indicated wherein the transmitter and receiver are mounted within the same container or package thereby making the apparatus convenient and easy to use.

While the invention is described in connection with infrared radiation, it will be understood that other forms of radiation may be utilized in appropriate circumstances.

SUMMARY OF THE INVENTION

In carrying out the invention in one form an intrusion detection system is provided comprising means for projecting two radiation beams from source means into an area to be surveyed, said beams being adapted to reflect radiation back to the source when an object enters the beam pathway, means for pulsing said radiation beams alternately at a specified rate and means at said source for detecting reflections from objects struck by said beams, and means for distinguishing between reflections from one of said beams and successive reflections from both of said beams.

In carrying out the invention in another form a method of reducing the false alarm rate of an intrusion detection system is provided comprising transmitting alternately pulsed closely spaced radiation beams from which reflections are returned from an object entering the field of either one or both of said beams, detecting the return of reflected radiation and, distinguishing between the detection of a reflection return from one beam and successive returns from both beams.

Figure 1:
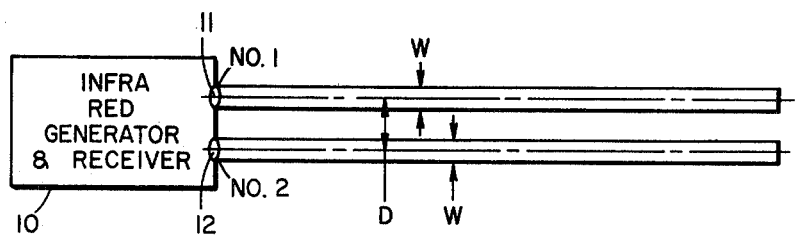
FIG. 1 is a schematic top view of an infrared intrusion detecting apparatus according to the invention.

Referring to the drawings, there is shown an infrared generator and receiver 10 including two optical systems shown schematically by lenses 11 and 12 which transmit respectively the infrared beams No. 1 and 2, respectively. By way of example only, the width W of the beams may be of the order of 1 to 2 inches, the distance D between the centers of the beams, at the generator, may be of the order of 4 inches, the length of the beams or range may be of the order of 200 feet, typically, and at the end of the beams the distance between the centers may be of the order of 8 to 12 inches.

Figure 2:
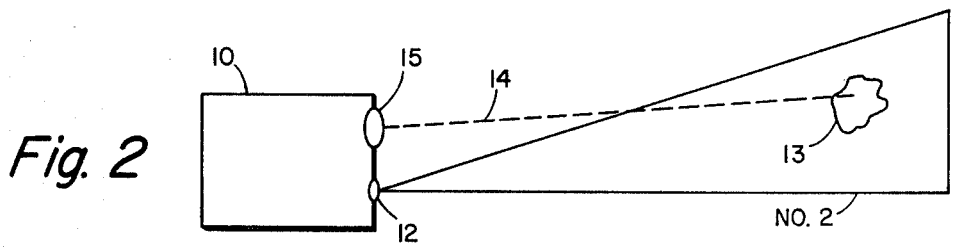
FIG. 2 is a side view of the apparatus shown in FIG. 1.

FIG. 2 is in essence a side view of FIG. 1 and shows the same infrared generator and receiver 10 with one of the optical systems 12 transmitting the beam from or through optical system 12, that is beam No. 2. As shown, beam No. 2 diverges upwardly so that at the extremity of the beam or range, the height of the beam may be about 10 feet, for example. It is not necessary that the beam diverge upwardly as shown. If desired, the beams may be essentially two circular tubes of infrared or other radiation. Shown within the volume of the beam No. 2 is a generalized object 13 from which infrared radiation is reflected along the pathway 14 through the receiving optical system 15. The optical systems 11, 12 and 15 are so arranged in the apparatus that beams sent out through optical systems 11 and 12 and reflected from an object 13 are received through the receiving lens system 15. That is to say the lens systems are fixed in relationship to each other and need not be adjusted for each case.

The two beams are aligned parallel to each other such that at about two hundred feet the separation of the two beams is approximately 8 to 12 inches.

Figure 5:
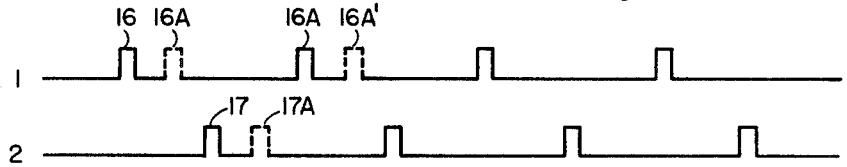
FIG. 5 is a time diagram showing transmitted and received pulses.
Figure 6:
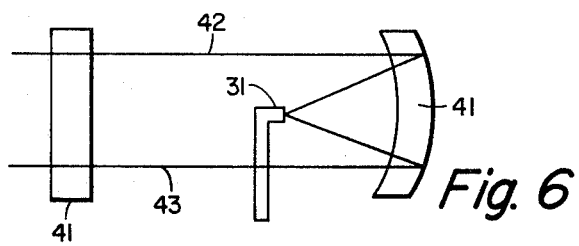
FIG. 6 is a diagrammatic view of a portion of the receiving apparatus.

Light pulses or infrared pulses are emitted alternately from the two transmitting optical systems as may be visualized in FIG. 5 wherein the pulses 16 are emanated through optical system 11, i.e. beam No. 1 and the pulses 17 spaced between the pulses 16 emanate from optical system 12, that is beam No. 2. The pulses 16 and 17 may be emitted at any pulse repetition frequency desired to give the information needed and in one practical case according to the invention, the frequency of the pulses 16 and 17 together was one hundred pulses per second.

For each pulse, target presence (true or false) is first sensed by the return signal exceeding a predetermined threshold. In addition, the signal processor used does not indicate true target detection until a multiple pulse detection criteria is satisfied. The simplest criteria is two pulses in a row. Such targets as bugs, flies, butterflies, leaves and discrete particulate matter are not large enough to be illuminated by both beams simultaneously and therefore for these targets, the multiple pulse criteria is not satisfied and a target detection signal is not generated. If the small target has a reasonably high velocity, such as would occur with a bird in flight, the system could false alarm when a target detection criteria of two consecutive threshold exceedences is used. For example, to produce a false alarm, the bird would have to be within one volume during the one hundred nanosecond period when it is illuminated and then fly to the adjacent volume and be contained within it during the 100 nanosecond pulse which occurs 10 milliseconds later. With a 4 inch separation between the illuminated cross sections and a pulse rate of 100 pulses per second, the normal component of the velocity must be approximately 400 inches per second (33.3 feet per second or 22.6 miles per hour). The probability of a false alarm due to a single bird can be reduced to an extremely low value by requiring detection of three consecutive pulses. In this case, it is highly unlikely that a single small object could produce a false alarm.

Figure 3:
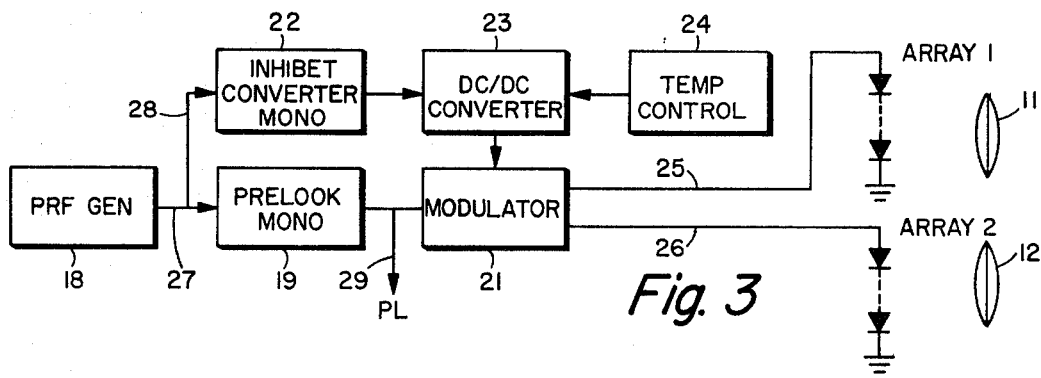
FIG. 3 is a block circuit diagram of transmitting apparatus according to the invention.

Referring to FIG. 3, the circuit for generating the infrared pulses is shown and comprises a pulse repetition frequency generator 18, a pre-look monostable 19, a modulator 21, array 1 and array 2 supplied from modulator 21, an inhibit converter monostable 22, a DC/DC converter 23 and a temperature control device 24.

Arrays 1 and 2 may, for example, comprise a series of gallium arsenide light emitting diodes, the infrared light of which is transmitted by the optical systems 11 and 12. The modulator 21 supplies pulses 16 and 17 over appropriate conductors 25 and 26 alternately, such that radiation occurs alternately from optical systems 11 and 12.

The PRF generator 18 may, for example, be a unijunction transistor oscillator running at a clock rate of 100 pulses per second. This output feeds the two monostables 19 and 22 through conductors 27 and 28.

The pre-look monostable 17 generates a pre-look (PL) pulse which appears on line 29 and is used to adjust the threshold as will be explained. The second monostable 22 generates a signal, for example, a one millisecond pulse that is used to inhibit the DC/DC converter 21 during the pre-look interval and the transmit/receive periods, thus eliminating potential RF interference in the receiver due to the DC/DC converter which operates at a nominal frequency of 20K hertz.

The drive current to the light emitter diodes must be varied with temperature since the threshold current of the light emitter diodes varies as a function of temperature, and it is desirable not to operate them at current levels above three times threshold. Therefore, the temperature control circuit 24 reduces the output voltage of the DC/DC converter as the temperature falls below ambient in such a manner as to keep the drive current to the light emitter diode arrays at approximately three times threshold. The modulator 21 may be any well known unit such, for example, as one suing a silicon controlled rectifier to switch the light emitting diode arrays to produce a 130 nanosecond, for example, pulse width at a typical current level of 25 amperes.

Figure 4:
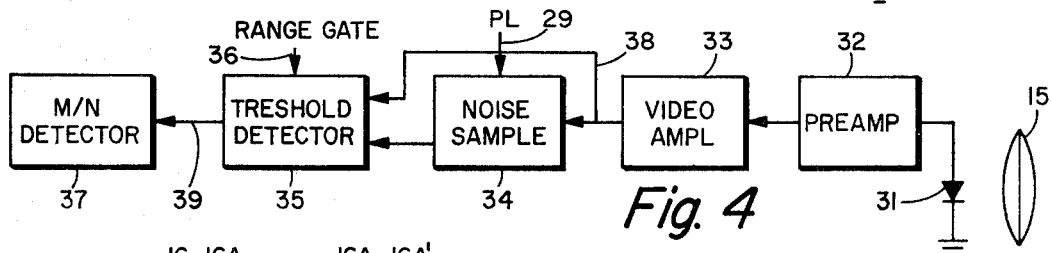
FIG. 4 is a block circuit diagram of receiving apparatus according to the invention.

Referring to FIG. 4, the receiver is shown as comprising an optical unit 15 which through circuit components to be described focuses radiation upon the photodiode 31 which operates as a detector, a pre-amplifier 32 receiving the signal from photodiode 31, a video amplifier 33, a noise sample circuit 34, a threshold detector 35 which may include a range gate 36 and an M/N detector or signal processor 37.

The effects of variations in the background illumination are minimized by varying the pulse threshold detector threshold level on a pulse by pulse basis depending on the average value of the noise occurring during a pre-look sample period which is measured just prior to the transmitter pulse. That is to say, the video amplifier 33 supplies a continuous on-going signal indicative of the general level of background noise over a conductor 38 to the threshold 35. The noise sample circuit 34 is in effect a sample and hold circuit and is triggered into action by the pulse PL from the pre-look monostable 19 just prior to the transmission of the transmitter pulses. The output of the noise sample pulse is a second input into the threshold detector 35 where a comparison is made between the two signals, one from the noise sample circuit 34 and the other from the video amplifier 33. The difference between these two input signals to the threshold detector 35 determines the threshold value which the intelligence or information pulse must exceed in order to be detected by the M/N detector. Accordingly, when a transmitter pulse 16 is sent out and is received back, and the returned signal is of sufficient amplitude to be higher than the threshold value determined in the threshold detector 35, and the range gate signal 36 is supplied to the threshold detector, the intelligence signal or information pulse is permitted to pass through conductor 39 to the M/N detector 34. The range gate is opened only at the time that the returned pulses shown dotted as 16A and 17A in FIG. 5 are expected to be received.

False alarms are reduced by the M/N detector, or signal processor, which is an analog integrator that indicates target detection only when single pulse detection occurs on at least M out of N consecutive pulses.

The decision criteria of the analog integrator 37 can be easily adjusted. Typical decision criteria that have been used are two out of three pulses and five out of seven pulses. The two out of three pulses, for example, would be pulses 16A, 17A and 16A'. Pulses 16A and 16A' are two successive pulses received back after being transmitted by array 1 whereas the pulse 17A is the alternate pulse, considered with 16A, received back after being transmitted by array 2.

The receiver optical system while shown diagrammatically as 15 in FIG. 3 may consist of an optical filter 41 which, for example, is an infrared filter in the event that infrared radiation is used. The infrared light output shown by the rays 42 and 43 impinges upon a reflective mirror 44, for example, a Mangin mirror as the reflecting element which reflects the rays 42 and 43 to the photodiode 31 from which the signal is supplied to the pre-amplifier 32 as described. The photodiode 31 is located at the focal point in front of the mirror 41.

The performance of the system may be analyzed assuming that at the maximum range the minimum signal to noise ratio at elevated temperatures would be plus 15dB. Using this value, the threshold level at the threshold detector 35 was set at approximately 3.5 times RMS noise level which provides a false alarm probability of $2 \times 10^{-4}$ and a probability of detection equal to 0.982. the 100 hertz pulse rate is adequate to insure that at least three hits occur for all human intruders. Therefore, the M/N detector uses a two out of three pulse detection to 0.999 and reduces the false alarm probability to $1.3 \times 10^{-7}$ per channel.

While the beams (FIG. 1) are shown as being horizontally side by side, it will be understood that, if circumstances require, the beams may be disposed vertically side by side.

What is claimed is:

1. An intrusion detection system for discriminating against targets smaller than a predetermined size comprising:
    means for projecting two relatively closely spaced and substantially parallel radiation beams from a source means into an area to be surveyed and being adapted to reflect radiation back to the source when an object enters the beam pathway, the spacing of said radiation beams being greater than said predetermined size,
    means for pulsing said radiation beams alternately at a specified rate and
    means at said source for detecting reflections from objects struck by said beams and
    means for distinguishing between reflections from one of said beams and successive reflections from both of said beams.

2. The intrusion detecting system according to claim 1 wherein the beams are of infrared radiation.

3. The intrusion detecting system according to claim 1 wherein each of said beams is essentially non-divergent in one direction and substantially divergent in a direction at right angles to said one direction.

4. The method of reducing the false alarm rate of an intrusion detection system comprising:
    transmitting alternately pulsed closely spaced-substantially parallel radiation beams which cause reflections to be returned from an object entering the field of either one or both of said beams, the spacing of said radiation beams being greater than a predetermined value,
    detecting the return of reflected radiation and,
    distinguishing between the detection of a reflection return from one beam and successive returns from both beams.

5. The method according to claim 4 wherein the beams are of infrared radiation.

6. The method according to claim 4 wherein the spacing between said means is less than the width of the object intended to be detected.

* * * * *